US012799925B2

(12) United States Patent
Zhang et al.

(10) Patent No.: US 12,799,925 B2
(45) Date of Patent: Nov. 17, 2026

(54) METHOD AND DEVICE FOR EVALUATING SERVICE LIFE OF PITCH BEARING OF WIND TURBINE

(71) Applicant: BEIJING GOLDWIND SCIENCE & CREATION WINDPOWER EQUIPMENT CO., LTD., Beijing (CN)

(72) Inventors: Pengfei Zhang, Beijing (CN); Huili Su, Beijing (CN); Wei Han, Beijing (CN); Shipei Zhao, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 348 days.

(21) Appl. No.: 18/574,154

(22) PCT Filed: Mar. 28, 2022

(86) PCT No.: PCT/CN2022/083377
§ 371 (c)(1),
(2) Date: Dec. 26, 2023

(87) PCT Pub. No.: WO2023/097938
PCT Pub. Date: Jun. 8, 2023

(65) Prior Publication Data

US 2024/0287968 A1 Aug. 29, 2024

(30) Foreign Application Priority Data

Nov. 30, 2021 (CN) ......................... 202111438432.7

(51) Int. Cl.
*F03D 17/00* (2016.01)
*F03D 80/70* (2016.01)

(52) U.S. Cl.
CPC ......... *F03D 17/032* (2023.08); *F03D 17/006* (2023.08); *F03D 17/011* (2023.08);
(Continued)

(58) Field of Classification Search
CPC .... F03D 17/006; F03D 17/011; F03D 17/029; F03D 17/032; F03D 80/701; F03D 15/00;
(Continued)

(56) References Cited

U.S. PATENT DOCUMENTS 4,582,013 A * 4/1986 Holland, Jr. ............ B63H 9/02 416/4
2010/0332153 A1 12/2010 Vegter et al.
(Continued)

FOREIGN PATENT DOCUMENTS

CN 104612897 A 5/2015
CN 105134510 A 12/2015
(Continued)

OTHER PUBLICATIONS

International Search Report mailed Jul. 29, 2022; PCT/CN2022/083377.
(Continued)

*Primary Examiner* — Thien M Le
(74) *Attorney, Agent, or Firm* — Frank Gao, Esq

(57) ABSTRACT

A service life evaluation method and device for a pitch bearing of a wind turbine are provided. The method includes: acquiring a probability density of a pitch driving torque in M historical periods, wherein M is a positive integer; acquiring an angle cumulative value of a pitch angle in each of the M historical periods; determining an equivalent load of the pitch bearing based on the pitch driving torque, the probability density of the pitch driving torque in the M historical periods, and angle cumulative values in the M historical periods; and determining a consumed service
(Continued)

life of the pitch bearing based on the equivalent load of the pitch bearing.

19 Claims, 5 Drawing Sheets

(52) U.S. Cl.
CPC ........ *F03D 80/701* (2023.08); *F05B 2260/80* (2013.01); *F05B 2270/404* (2013.01); *F05B 2270/808* (2013.01)

(58) Field of Classification Search
CPC .................. F03D 17/00; F05B 2260/80; F05B 2270/404; F05B 2270/808; F16C 17/00; F16C 19/00; F16C 2233/00; F16C 2300/14; F16C 2360/31; G06F 17/18; G06F 17/16; G01M 13/04; Y02E 10/72
See application file for complete search history.

(56) References Cited

U.S. PATENT DOCUMENTS

| | | | | |
|---|---|---|---|---|
| 2012/0148411 | A1* | 6/2012 | Andersen ................ | F03D 80/50 29/889 |
| 2014/0288855 | A1* | 9/2014 | Deshpande ........... | F03D 7/0292 702/34 |
| 2014/0347043 | A1* | 11/2014 | Chana ................ | G01N 27/9046 324/242 |
| 2015/0167637 | A1 | 6/2015 | Kooijman et al. | |
| 2019/0048849 | A1 | 2/2019 | Grunnet et al. | |
| 2019/0178231 | A1* | 6/2019 | Tomas ...................... | F03D 7/02 |
| 2020/0201950 | A1* | 6/2020 | Wang ...................... | F03D 17/00 |
| 2020/0210537 | A1* | 7/2020 | Wang ...................... | G06F 17/16 |
| 2020/0210824 | A1* | 7/2020 | Poornaki ................ | G06N 3/082 |
| 2020/0347824 | A1 | 11/2020 | Yu et al. | |
| 2021/0203157 | A1* | 7/2021 | Visweswariah .... | G05B 23/0283 |
| 2023/0076135 | A1* | 3/2023 | Tesar .................... | F16H 57/082 |
| 2024/0201680 | A1* | 6/2024 | Fluchel .................. | G06Q 10/20 |

FOREIGN PATENT DOCUMENTS

| | | | |
|---|---|---|---|
| CN | 106126843 | A | 11/2016 |
| CN | 107590356 | A | 1/2018 |
| CN | 107908916 | A | 4/2018 |
| CN | 113374652 | A | 9/2021 |
| CN | 113623142 | A | 11/2021 |
| WO | 2019/148775 | A1 | 8/2019 |

OTHER PUBLICATIONS

Extended European Search Report dated Sep. 23, 2024; Appln. No. 22899761.5.
The 1st Brazilian Office Action (Search Report) issued Aug. 6, 2026; BR11202400165-0.

* cited by examiner

METHOD AND DEVICE FOR EVALUATING SERVICE LIFE OF PITCH BEARING OF WIND TURBINE

This application is the national phase of International Patent Application No. PCT/CN2022/083377 filed on Mar. 28, 2022, which claims the benefit of Chinese Patent Application No. 202111438432.7, entitled "METHOD AND DEVICE FOR EVALUATING SERVICE LIFE OF PITCH BEARING OF WIND TURBINE", filed on Nov. 30, 2021 with the China National Intellectual Property Administration (CNIPA), both of which are incorporated herein by reference in their entireties.

TECHNICAL FIELD

The present disclosure relates to the field of wind power generation, and in particular to a service life evaluation method and device for a pitch bearing of a wind turbine.

BACKGROUND

A pitch bearing of a wind turbine is an important component to connect blades with a hub, and is also used to transfer a load on the blades to a pitch system on the hub. The pitch system is an important safety system for the wind turbine, a failure of which may lead to devastating disasters. Therefore, service life evaluation for the pitch bearing during operation of the wind turbine becomes particularly important and critical.

In the related technology, a service life of a pitch bearing of an in-service wind turbine is evaluated based on a load of the pitch bearing collected by a load sensor installed.

However, such solution has a long installation period and intensive capital consumption, and requires a large capital cost and time cost to achieve full coverage of all wind turbines in a wind power plant.

SUMMARY

Therefore, reasonably estimating a load of a pitch bearing with parameters that may be directly acquired at present is crucial for online service life evaluation for the pitch bearing at low cost.

In a general aspect, a service life evaluation method for a pitch bearing of a wind turbine is provided. The method includes: acquiring a probability density of a pitch driving torque in M historical periods, where M is a positive integer; acquiring an angle cumulative value of a pitch angle in each of the M historical periods; determining an equivalent load of the pitch bearing based on the pitch driving torque, the probability density of the pitch driving torque in the M historical periods, and angle cumulative values in the M historical periods; and determining a consumed service life of the pitch bearing based on the equivalent load of the pitch bearing.

In another general aspect, a service life evaluation device for a pitch bearing of a wind turbine is provided. The device includes: a first acquisition unit configured to acquire a probability density of a pitch driving torque in M historical periods, and acquire an angle cumulative value of a pitch angle in each of the M historical periods, where M is a positive integer; an equivalent unit configured to determine an equivalent load of the pitch bearing based on the pitch driving torque, the probability density of the pitch driving torque in the M historical periods, and angle cumulative values in the M historical periods; and a first calculation unit configured to determine a consumed service life of the pitch bearing based on the equivalent load of the pitch bearing.

In another general aspect, a computer-readable storage medium is provided. Instructions in the computer-readable storage medium, when executed by at least one processor, cause the at least one processor to perform the service life evaluation method as described above.

In another general aspect, a computer apparatus is provided. The computer apparatus includes: at least one processor; and at least one memory configured to store computer-executable instructions, where the computer-executable instructions, when executed by the at least one processor, cause the at least one processor to perform the service life evaluation method as described above.

According to the present disclosure, a service life of a pitch bearing is evaluated by using operation data inevitably to be collected during operation of a wind turbine. No additional data is required to be collected, and thus no additional data collection sensor is required to be deployed. Therefore, a product cost can be reduced and a time cost of service life evaluation can be saved. According to the present disclosure, within an acceptable precision range, real-time online evaluation of a consumed service life and prediction of a future remaining service life can be achieved. Predictive operation and maintenance and prediction of failure events may be carried out on the premise of ensuring safe operation of the wind turbine, thereby reducing an unplanned downtime of the wind turbine and improving its economic benefit.

It should be understood that the above general descriptions and the following detailed descriptions are merely for exemplary and explanatory purposes, and are not intended to limit the present disclosure.

DETAILED DESCRIPTION OF THE EMBODIMENTS

Figure 1:
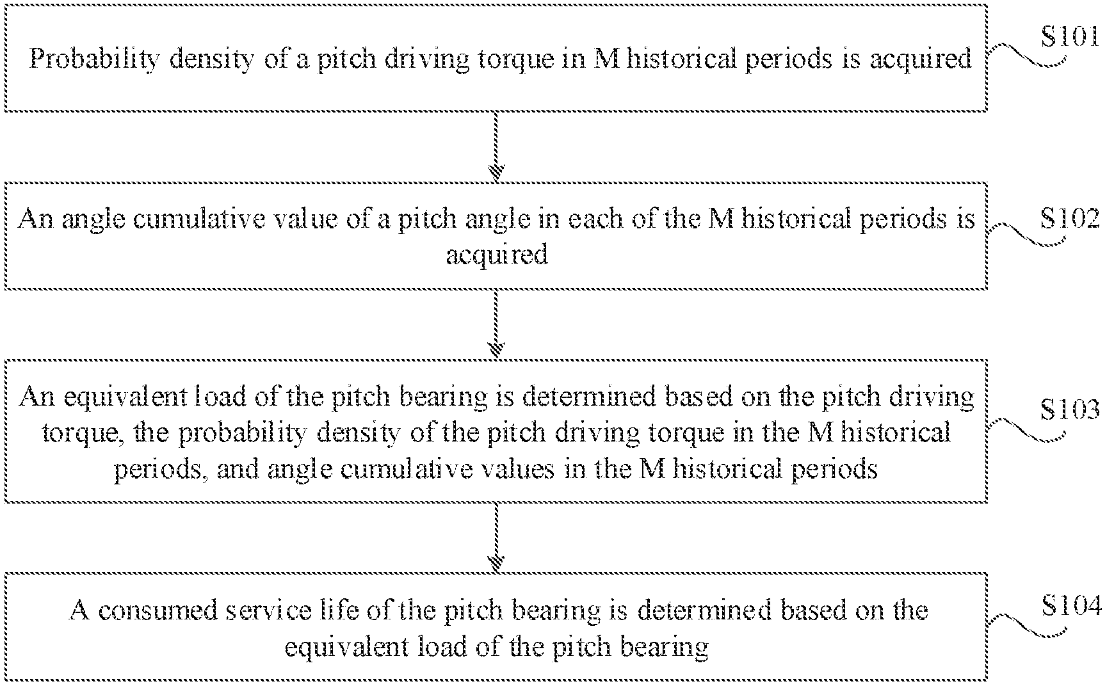
FIG. 1 is a flowchart illustrating a service life evaluation method for a pitch bearing of a wind turbine according to an embodiment of the present disclosure.

Specific embodiments are provided below to help readers to gain a comprehensive understanding of the method, apparatus, and/or system described herein. However, after understanding the present disclosure, various changes, modifications, and equivalents of the method, apparatus, and/or system described herein would be clear. For example, an order of operations described herein is only exemplary and but not limitary, and may be changed as would be clear after understanding the present disclosure, except for operations that must occur in a specific order. In addition, description of features known in the art may be omitted, for clarity and conciseness.

The features described herein may be implemented in different forms and should not be limited to the examples described here. On the contrary, the examples described here are provided to illustrate only some of many feasible ways for implementing the method, apparatus, and/or system described here, and many feasible ways would be clear after understanding the present disclosure.

As used herein, the term "and/or" includes any one of listed items associated with the term, and any combination of any two or more of the items.

Although terms "first," "second," "third" and the like may be used herein to describe various members, components, regions, layers, or parts, these members, components, regions, layers, or parts should not be limited by these terms. On the contrary, these terms are only used to distinguish one member, component, region, layer, or part from another member, component, region, layer, or part. Therefore, without departing from the teachings of the examples, a first member, first component, first region, first layer, or first part referred to in the examples described herein may alternatively be referred to as a second member, second component, second region, second layer, or second part.

In the specification, an element (such as a layer, region, or substrate) described as being "on", "connected to", or "bonded to" another element may be directly "on", "connected to", or "bonded to" another element, or there may be one or more other elements between the two elements. On the contrary, when an element is described as "directly on" another element, "directly connected to" or "directly bonded to" another element, there may be no other elements between the two elements.

The terms used herein are only for describing various examples and are not intended to limit the present disclosure. Unless clearly indicated in the context otherwise, a singular form is also intended to include a plural form. Terms "include", "comprise", and "have" indicate existence of a mentioned feature, quantity, operation, member, element, and/or combination thereof, but do not exclude existence or addition of one or more other features, quantities, operations, members, elements, and/or combinations thereof.

Unless otherwise defined, all terms used herein (including technical terms and scientific terms) have the same meanings as those commonly understood by those skilled in the art to which the present disclosure pertains after understanding the present disclosure. Unless explicitly defined otherwise, terms (such as those defined in a general dictionary) should be interpreted as having meanings consistent with their respective contexts in the relevant field and in the present disclosure, and should not be interpreted ideally or too formally.

In addition, in the description of the examples, detail description of well-known relevant structures or functions are omitted, when it is believed that the detailed description may lead to ambiguity of the present disclosure.

Figure 2:
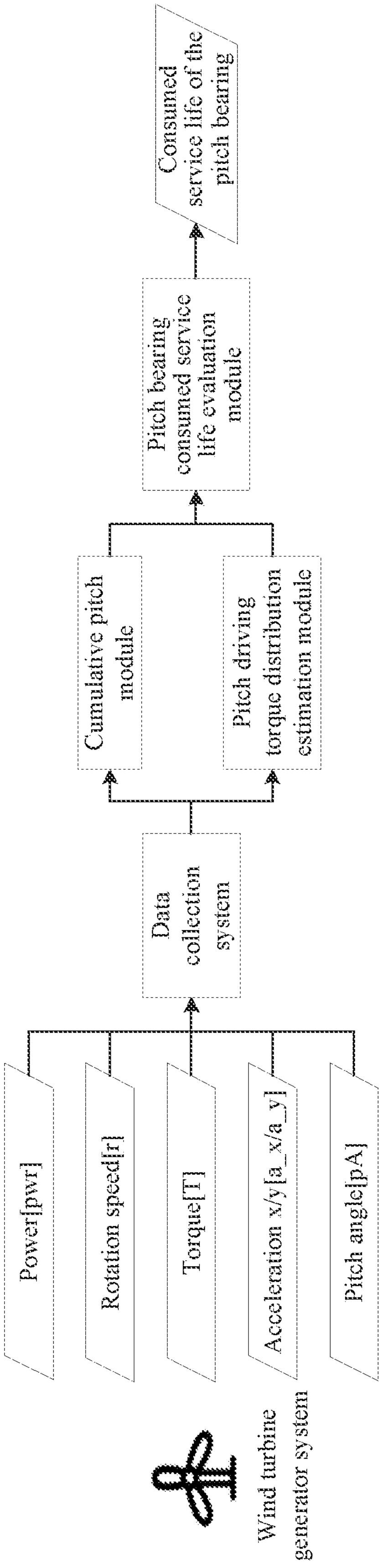
FIG. 2 is a schematic flowchart illustrating an online service life evaluation system for a pitch bearing according to an embodiment of the present disclosure.
Figure 3:
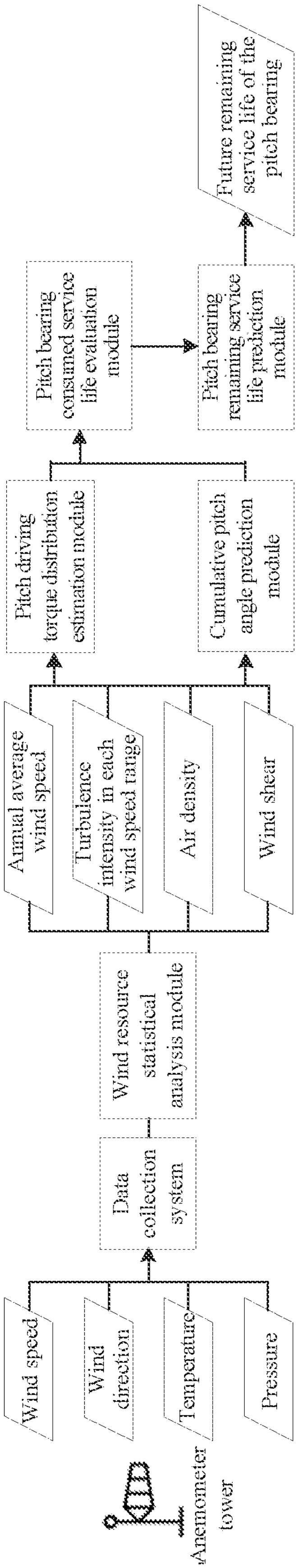
FIG. 3 is a schematic flowchart illustrating a system for predicting remaining service life of a pitch bearing according to an embodiment of the present disclosure.

FIG. 1 is a flowchart illustrating a service life evaluation method for a pitch bearing of a wind turbine according to an embodiment of the present disclosure. The method for evaluating service life may rely on a service life evaluation system, which may further include an online service life evaluation system configured to evaluate a consumed service life of the pitch bearing and a remaining service life prediction system configured to evaluate a future estimated remaining service life of the pitch bearing. FIG. 2 is a schematic flowchart illustrating an online system for evaluating service life of a pitch bearing according to an embodiment of the present disclosure. FIG. 3 is a schematic flowchart illustrating a system for predicting remaining service life of a pitch bearing according to an embodiment of the present disclosure.

Referring to FIG. 1, in step S101, a probability density of a pitch driving torque in M historical periods is acquired, where M is a positive integer. Because the pitch driving torque may affect a loss of the pitch bearing, this parameter is selected to evaluate the service life of the pitch bearing. It should be noted that the pitch driving torque is a force that controls a rotation angle of blades. Further, the wind turbine may generally operate for several years cumulatively. Cumulative operation duration may be divided into M historical periods based on a certain step (for example, 10 minutes), and data processing may be carried out separately for each of the historical periods, to ensure the consistency of duration of a single historical period used in evaluation of different wind turbines, thus ensuring the universality of the strategy.

In an embodiment, the pitch driving torque usually changes in a certain interval. For example, for a wind turbine with rated capacity less than 5MW, a pitch driving torque is generally in an interval of [−200 KNm, 200 KNm]. Multiple specific numerical values may be selected from the interval. For example, multiple specific pitch driving torques are obtained based on a set step. That is, the selected multiple pitch driving torques may form an arithmetic progression. Then, a probability density of each of the pitch driving torques in each of the historical periods is acquired in step S101.

Referring to FIG. 2, step S101 includes: for each of the pitch driving torques, determining an occurrence frequency of the pitch driving torque in each of different pitch motion states and a corresponding distribution parameter based on operation data in the M historical periods (it should be understood that "corresponding" here means that the distribution parameter corresponds to the occurrence frequency and also to the pitch motion state), where the pitch motion states include forward state, constant state and backward state; and determining the probability density based on the occurrence frequencies and the corresponding distribution parameters. It should be noted that the pitch motion state refers to a motion state that drives the blades to vary pitch. For example, in a case that a hydraulic rod for driving rotation of a blade root is gradually pushed out to a full out state, the blade root drives the blades to gradually rotate to a feathering state, and at this time, the pitch motion state is the forward state. The backward state is opposite to the forward state. That is, in a case that the hydraulic rod for driving rotation of the blade root gradually returns into a hydraulic cylinder from the full out state, the blade root drives the blades to gradually rotate in a reverse direction from the feathering state to a reverse pitch state, and at this time, the pitch motion state is the backward state. In a case that the hydraulic rod for driving rotation of the blade root remains stationary, the blades do not move, and at this time, the pitch motion state is the constant state. For purpose of understanding, connection relationships among various structures are briefly explained. The hydraulic rod is installed in the hydraulic cylinder in a stretchable manner, an output end of the hydraulic rod is connected to a pitch crank on the blade root through a hydraulic rod bearing, and stretch of the hydraulic rod drives the blade root to rotate. According to an embodiment of the present disclosure, operation data of the wind turbine is collected by a data collection system as shown in FIG. 2. Thus, before step S101, the method further includes collecting operation data of the wind turbine in the M historical periods. The operation data is Supervisory Control and Data Acquisition (SCADA) data, including an output power, an impeller rotation speed, a generator torque, a nacelle acceleration x-direction component, a nacelle acceleration y-direction component and a pitch angle, which may fully reflect operation conditions of the wind turbine, these conditions being related to the pitch driving torque. Therefore, the distribution parameter of the pitch driving torque may be determined by a pitch driving torque distribution evaluation module as shown in FIG. 2 accordingly. In addition, because the data is collected during operation of the wind turbine, no additional data is required to be collected, and thus no additional data collection sensor is required to be configured. Therefore, a product cost can be reduced and a time cost of service life evaluation can be saved, thus improving the economic performance.

Based on the forward state, the backward state and the constant state of blade pitch, there are three different pitch motion states. In each of the historical periods, the pitch driving torques may go through these three states. Therefore, an occurrence frequency of the pitch driving torque in each of the three pitch motion states and a corresponding distribution parameter may be determined, to describe the pitch driving torque more accurately.

As an example, for one of the historical periods, the pitch motion usually only has the above three states. Therefore, a sum of occurrence frequencies for the three states is equal to 1. The occurrence frequency is expressed by the following equation:

$$f_t = \begin{cases} f_{1,t}, & \text{forward state} \\ (1 - f_{1,t} - f_{2,t}), & \text{constant state} \\ f_{2,t}, & \text{backward state} \end{cases}$$

Based on the above equation, a probability density of a pitch driving torque $L_i$ in a certain historical period t may be described as:

$$p_t(L_i) = f_{1,t} * f_{t,1}(L_i) + (1 - f_{1,t} - f_{2,t}) * f_{t,3}(L_i) + f_{2,t} * f_{t,2}(L_i)$$

where $f_{t,1}(L_i)$, $f_{t,3}(L_i)$, $f_{t,2}(L_i)$ represent probability densities of the pitch driving torque $L_i$ in three pitch motion states respectively. It should be noted that to represent both probability density and the occurrence frequency by the same character f, a subscript t is placed in front of or behind the number for differentiation. In an example in which the probability density follows a normal distribution, the probability density may be expressed by a mathematic expectation y and a standard deviation σ of a variable (in this case, the pitch driving torque $L_i$), that is, $$f_t(L_i) = \begin{cases} f_{t,1}(L_i, \mu_{f_{t,1}}, \sigma_{f_{t,1}}), & \text{forward state} \\ f_{t,3}(L_i, \mu_{f_{t,a}}, \sigma_{f_{t,a}}), & \text{constant state} \\ f_{t,2}(L_i, \mu_{f_{t,2}}, \sigma_{f_{t,2}}), & \text{backward state} \end{cases}$$

where $\mu_{f_{t,1}}$, $\sigma_{f_{t,1}}$, $\mu_{f_{t,2}}$, $\sigma_{f_{t,2}}$, $\mu_{f_{t,3}}$, $\sigma_{f_{t,3}}$ respectively represent distribution parameters of the pitch driving torque $L_i$ in three pitch motion states in the historical period t, and subscripts $f_{t,1}$, $f_{t,2}$, $f_{t,3}$ represent the forward state, the backward state, and the constant state respectively. That is, in this example, the probability density $p_t(L_i)$ of the pitch driving torque $L_i$ may be obtained by using these eight parameters of $f_{1,t}$, $f_{2,t}$, $\mu_{f_{t,1}}$, $\sigma_{f_{t,1}}$, $\mu_{f_{t,2}}$, $\sigma_{f_{t,2}}$, $\mu_{f_{t,3}}$, $\sigma_{f_{t,3}}$.

In an embodiment, in determining the occurrence frequency of the pitch driving torque in each of different pitch motion states and the corresponding distribution parameter based on the operation data, for purpose of data calculation, operation data collected in each of the historical periods may form one multi-dimensional vector, which is recorded as an operation data column vector. For example, for the different operation data described above, the output power Pwr, the impeller rotation speed r, the generator torque T, the nacelle acceleration x-direction component Ax, the nacelle acceleration y-direction component Ay, and the pitch angle Pa may form a 6-dimensional vector $[Pwr_t, r_t, T_t, Ax_t, Ay_t, Pa_t]$, where t in the subscript represents a certain historical period. Calculation targets, i.e., the occurrence frequency and the distribution parameter, may form a multi-dimensional vector, which is $[f_{1,t}, f_{2,t}, \mu_{f_{t,2}}, \sigma_{f_{t,1}}, \mu_{f_{t,2}}, \sigma_{f_{t,2}}, \mu_{f_{t,3}}, \sigma_{f_{t,3}}]$ for the example described above.

The occurrence frequency and the corresponding distribution parameter described above may be determined by using the following equation.

$$\begin{bmatrix} f_{1,t} \\ f_{2,t} \\ \mu_{f_{t,1}} \\ \sigma_{f_{t,1}} \\ \mu_{f_{t,2}} \\ \sigma_{f_{t,2}} \\ \mu_{f_{t,a}} \\ \sigma_{f_{t,a}} \end{bmatrix} = G_1\left(\begin{bmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \\ a_{41} & a_{42} & a_{43} & a_{44} & a_{45} & a_{46} \\ a_{51} & a_{52} & a_{53} & a_{54} & a_{55} & a_{56} \\ a_{61} & a_{62} & a_{63} & a_{64} & a_{65} & a_{6} \\ a_{71} & a_{72} & a_{73} & a_{74} & a_{75} & a_{76} \\ a_{81} & a_{82} & a_{83} & a_{84} & a_{85} & a_{86} \end{bmatrix} G_0\left(\begin{bmatrix} Pwr_t \\ r_t \\ T_t \\ Ax_t \\ Ay_t \\ Pa_t \end{bmatrix}\right) + \begin{bmatrix} b_1 \\ b_2 \\ b_3 \\ b_4 \\ b_5 \\ b_6 \\ b_7 \\ b_8 \end{bmatrix}\right) + \begin{bmatrix} c_1 \\ c_2 \\ c_3 \\ c_4 \\ c_5 \\ c_6 \\ c_7 \\ c_8 \end{bmatrix}$$

In an embodiment, for each of the historical periods, a product of a correlation coefficient matrix $a_{i,j}$, a first transfer function $G_0$ and an operation data column vector is determined to obtain a first column vector, where the number of rows of the correlation coefficient matrix is equal to a sum of the number of occurrence frequencies and the number of corresponding distribution parameters, and the operation data column vector includes multiple items of the operation data. In this example, the number of rows of the correlation coefficient matrix may be equal to 8. That is, a weighted sum of the multiple items of operation data may be calculated by using products of a row of coefficients in the correlation coefficient matrix $a_{i,j}$ and the first transfer function $G_0$ as weights, thereby merging the multiple items of operation data into a single data. The number of weighted sums is dependent on the required number of parameters to be output. Then, a sum of the first column vector (formed by the multiple weighted sums described above) and a first correlation coefficient column vector $b_i$ is determined, and the sum is multiplied with a second transfer function $G_1$ to obtain a second column vector. Next, a sum of the second column vector and a second correlation coefficient column vector $c_i$ is determined (which is equivalent to changing the weighted sums described above for many times) as an output vector, where the output vector includes values of the occurrence frequency and the corresponding distribution parameter. Thus, data is converted. According to an embodiment of the present disclosure, the correlation coefficient matrix, the first correlation coefficient column vector, the second correlation coefficient column vector, the first transfer function and the second transfer function are obtained by testing or training. It should be understood that the subscript i in each of correlation coefficients here represents a serial number of a specific coefficient, which is irrelevant to the subscript i of the pitch driving torque.

Referring back to FIG. 1, in step S102, an angle cumulative value of a pitch angle in each of the M historical periods is acquired. The angle cumulative value is obtained by a cumulative pitch module as shown in FIG. 2. Pitch variation essentially means that the blades rotate by a certain angle under the action of the pitch driving torque. Therefore, accumulation of the pitch driving torque in the term of the pitch angle can fully reflect a load borne by the pitch bearing. The acquired angle cumulative value may be used as a basis for service life evaluation of the pitch bearing.

In an embodiment, in one of the historical periods, the blades may first subject to pitch variation in a forward direction and then in a backward direction, offsetting with each other. Therefore, the angle cumulative value of the pitch angle may be gradually calculated based on a set frequency. As an example, the following equation may be used:

$$\Delta\phi = \sum_{i=0}^{N} |\phi_i - \phi_{i+1}|$$

In the above equation, i=1,2, . . . , N, N=600, representing that a sampling frequency is 1 Hz, and $\phi_i$ represents an i-th pitch angle in the historical period.

In step S103, an equivalent load of the pitch bearing is determined based on the pitch driving torque, the probability density of the pitch driving torque in the M historical periods, and angle cumulative values in the M historical periods. The equivalent load of the pitch bearing is obtained by a pitch bearing consumed service life evaluation module as shown in FIG. 2. As mentioned above, the equivalent load of the pitch bearing may be obtained by the accumulation of the pitch driving torque in the term of the pitch angle.

In an embodiment, step S103 includes: for each of the historical periods, determining a product of an m-th power of each pitch driving torque, a probability density of the pitch driving torque and the angle cumulative value, and calculating a sum of the products corresponding to the pitch driving torques to obtain a reference load for the historical period, where m represents a material Wall coefficient of the pitch bearing; determining a reference load average value in multiple historical periods; and determining a (1/m)-th power of the reference load average value as the equivalent load of the pitch bearing.

For a pitch system of an in-service in-operation wind turbine that has experienced the M historical periods, probability densities of N pitch driving torques may be summarized to obtain the following process matrix:

$$\begin{array}{cccccc}
\downarrow & L_1 & L_2 & L_3 & \ldots & L_N \\
t_1 & p_1(L_1) & p_1(L_2) & p_1(L_3) & \ldots & p_1(L_N) \\
t_2 & p_2(L_1) & p_2(L_2) & p_2(L_3) & \ldots & p_2(L_N) \\
t_3 & p_3(L_1) & p_3(L_2) & p_3(L_3) & \ldots & p_3(L_N) \\
\vdots & \vdots & \vdots & \vdots & \ddots & \vdots \\
t_M & p_M(L_1) & p_M(L_2) & p_M(L_3) & \ldots & p_M(L_N)
\end{array}$$

By taking the pitch driving torque $L_1$ as an example, a column of data below $L_1$ each represents a probability density of the pitch driving torque $L_1$ in each of the historical periods.

The angle cumulative values of the pitch angles in the M historical periods may be summarized to obtain the following process matrix:

$$\begin{array}{cccccc}
\downarrow & L_1 & L_2 & L_3 & \ldots & L_N \\
t_1 & \Delta\phi_1 & \Delta\phi_1 & \Delta\phi_1 & \ldots & \Delta\phi_1 \\
t_2 & \Delta\phi_2 & \Delta\phi_2 & \Delta\phi_2 & \ldots & \Delta\phi_2 \\
t_3 & \Delta\phi_3 & \Delta\phi_3 & \Delta\phi_3 & \ldots & \Delta\phi_3 \\
\vdots & \vdots & \vdots & \vdots & \ddots & \vdots \\
t_M & \Delta\phi_M & \Delta\phi_M & \Delta\phi_M & \ldots & \Delta\phi_M
\end{array}$$

Similar to the previous process matrix, by taking the pitch driving torque $L_1$ as an example, a column of data below $L_1$ each represents an angle cumulative value of the pitch angle corresponding to the pitch driving torque $L_1$ in each of the historical periods. The difference between the two matrices is that angle cumulative values in a same row (that is, in each of the historical periods) are the same since the angle cumulative value is fixed and does not change with the pitch driving torques in one historical period.

The equivalent load of the pitch bearing is expressed by the following equation:

$$L_{DEQ_{site}} = \sqrt[m]{\sum_{j=1}^{M}\sum_{i=1}^{N}\frac{\Delta\phi_j p_j(L_i) L_i^m}{M}}$$

In step S104, a consumed service life of the pitch bearing is determined based on the equivalent load of the pitch bearing. The consumed service life is obtained by the pitch bearing consumed service life evaluation module as shown in FIG. 2. In an embodiment, a ratio of the equivalent load of the pitch bearing to a designed equivalent load may be determined first, and then a product of the ratio and a designed service life of the pitch bearing may be determined as the consumed service life of the pitch bearing, which may be expressed by the following equation:

$$l = \frac{L^m_{DEQ_{site}}}{L^m_{DEQ_{design}}} \text{lifetime}_{design}$$

$L^m_{DEQ_{design}}$ represents the designed equivalent load of the pitch bearing, and service $\text{lifetime}_{design}$ represents the designed service life of the pitch bearing.

In an embodiment, the method of service life evaluation according to the embodiment of the present disclosure may further include: acquiring estimated wind resource parameters of multiple wind turbine positions in a target future period, where the estimated wind resource parameters include estimated wind speeds; for each of the pitch driving torques, determining a probability density of the pitch driving torque at multiple estimated wind speeds and an estimated angle cumulative value of the pitch angle in the target future period based on the estimated wind resource parameters; determining an estimated equivalent load of the pitch bearing in the target future period based on the multiple estimated wind speeds, the pitch driving torques, the probability density of each pitch driving torque at the multiple estimated wind speeds, and the estimated angle cumulative value at the multiple estimated wind speeds; determining an estimated service life consumption of the pitch bearing in the target future period based on the estimated equivalent load; and determining an estimated remaining service life of the pitch bearing based on a designed service life, the consumed service life and the estimated service life consumption of the pitch bearing.

For a pitch bearing of a wind turbine in operation, a consumed service life may be obtained by the online system for evaluating service life of a pitch bearing as shown in FIG. 2. For a remaining service life, although operation data of the wind turbine in future cannot be acquired in advance, subsequent operation of the wind turbine is affected by wind resource conditions of a wind power plant in future. Based on estimated wind resource parameters of multiple wind turbine positions in a target future period, an estimated equivalent load of the pitch bearing in the target future period may be estimated, thus a service life consumption in the target future period may be evaluated. Finally, an estimated remaining service life of the pitch bearing at the end of the target future period may be obtained based on the estimated service life consumption, a designed service life and the consumed service life. Because wind resource parameters for the next few years may be predicted based on the current wind resource analysis technology, estimated wind resource parameters in the target future period may be obtained by a data collection system and a wind resource statistical analysis module as shown in FIG. 3. Therefore, no additional data is required to be collected, and thus no additional data collection sensor is required to be deployed. Therefore, a product cost can be reduced and a time cost of service life evaluation can be saved, thus improving the economic performance.

In an embodiment, the system for predicting remaining service life of a pitch bearing may take estimated wind resource parameters as input. First, for each pitch driving torque, a probability density of the pitch driving torque (which may be the same as the pitch driving torque in step S101) at multiple estimated wind speeds is estimated by the pitch driving torque distribution estimation module as shown in FIG. 3, and an estimated angle cumulative value of the pitch angle in the target future period is estimated by the cumulative pitch angle prediction module as shown in FIG. 3. The estimation may be implemented by using the transfer function and correlation coefficient, for which reference may be made to step S101.

As an example, an estimated wind speed v may be an annual average wind speed. The estimated wind resource parameters further include a turbulence intensity ti, a wind shear α and an air density ρ. For a wind power plant, different estimated wind speeds v may occur with different attribute values (different turbulence intensities ti, different wind shears α, or the like). An input (i.e., estimated wind resource parameters) of the pitch driving torque distribution estimation module and the cumulative pitch angle prediction module is a single estimated wind speed $v_k$ and an attribute value of $v_k$, and the air density ρ is added to the estimated wind resource parameters as a constant attribute value. That is, $[v_k, ti_k, \alpha_k, \rho_k]$ represents an input vector, where k in a subscript represents a serial number of the estimated wind speed.

For the pitch driving torque distribution estimation module, the division of pitch motion states at a single estimated wind speed is the same as that in the above embodiment.

Three pitch motion states are divided based on a forward state, a backward state and a constant state of blade pitch. An output may still be distribution parameters in each of the three pitch motion states and corresponding occurrence frequencies. Thus, a probability density distribution of a pitch driving torque at the estimated wind speed may be determined by using the distribution parameter and the occurrence frequency of the pitch driving torque at the estimated wind speed. A probability density of a pitch driving torque $L_i$ at a certain estimated wind speed v is expressed by the following equation:

$$p_v(L_i) = f_{1,v} * f_{v,1}(L_i) + (1 - f_{1,v} - f_{2,v}) * f_{v,3}(L_i) + f_{2,v} * f_{v,2}(L_i)$$

The pitch driving torque at a single estimated wind speed may go through all three states, with corresponding occurrence frequencies of $f_{1,v}$, $1-f_{1,v}-f_{2,v}$, and $f_{2,v}$. The pitch driving torque at the three states has respective probability densities, i.e., $f_{v,1}(L_i)$, $f_{v,3}(L_i)$, $f_{v,2}(L_i)$. Similar to $p_t(L_i)$, to represent both the probability density and the occurrence frequency by the same character f, a subscript of v is placed in front of or behind the numbers for differentiation. In addition, referring to the probability densities of the pitch driving torque $L_i$ in three pitch motion states in the historical period t, the probability densities $f_{v,1}(L_i)$, $f_{v,3}(L_i)$, and $f_{v,2}(L_i)$ of the pitch driving torque $L_i$ in three pitch motion states at the estimated wind speed v may also follow a normal distribution, and thus may also be expressed by a mathematic expectation μ and a standard deviation σ of the pitch driving torque $L_i$. That is, distribution parameters are $\mu_{f_{v,1}}$, $\sigma_{f_{v,1}}$, $\mu_{f_{v,2}}$, $\sigma_{f_{v,2}}$, $\mu_{f_{v,3}}$, $\sigma_{f_{v,3}}$. The occurrence frequencies and the corresponding distribution parameters described above may be determined by using the following equation.

$$\begin{bmatrix} f_{1,v} \\ f_{2,v} \\ \mu_{f_{v,1}} \\ \sigma_{f_{v,1}} \\ \mu_{f_{v,2}} \\ \sigma_{f_{v,2}} \\ \mu_{f_{v,a}} \\ \sigma_{f_{v,a}} \end{bmatrix} = F_1\left(\begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \\ a_{51} & a_{52} & a_{53} & a_{54} \\ a_{61} & a_{62} & a_{63} & a_{64} \\ a_{71} & a_{72} & a_{73} & a_{74} \\ a_{81} & a_{82} & a_{83} & a_{84} \end{bmatrix} F_0\left(\begin{bmatrix} v_k \\ ti_k \\ \alpha_k \\ \rho_k \end{bmatrix}\right) + \begin{bmatrix} b_1 \\ b_2 \\ b_3 \\ b_4 \\ b_5 \\ b_6 \\ b_7 \\ b_8 \end{bmatrix}\right) + \begin{bmatrix} c_1 \\ c_2 \\ c_3 \\ c_4 \\ c_5 \\ c_6 \\ c_7 \\ c_8 \end{bmatrix}$$

$F_1$, $F_0$ represent transfer functions, and $a_{m,n}$, $b_m$, $c_n$ represent correlation coefficients. The transfer functions and the correlation coefficients may be obtained by training with a simulated database. $p_v(L_i)$ may be obtained by substituting the occurrence frequencies and the distribution parameters obtained into the above equation of $p_v(L_i)$.

The cumulative pitch angle prediction module can predict an estimated angle cumulative value of the pitch angle at a single estimated wind speed by the following prediction equation:

$$\Delta\phi_v = Q_1\left(\begin{bmatrix} a_1 & a_2 & a_3 & a_4 \end{bmatrix} Q_0\left(\begin{bmatrix} v_k \\ ti_k \\ \alpha_k \\ \rho_k \end{bmatrix}\right) + b_1\right) + c_1$$

$Q_1$, $Q_0$ represent transfer functions, and $a_1$, $a_2$, $a_3$, $a_4$, $b_1$, $c_1$ represent correlation coefficients. The transfer functions and the correlation coefficients may be obtained by training with a simulated database.

After the distribution parameters of the pitch driving torques at multiple estimated wind speeds and the estimated angle cumulative value of the pitch angle in the target future period are determined, an estimated equivalent load and an estimated service life consumption may be estimated by a pitch bearing consumed service life evaluation module as shown in FIG. 3 in a way similar to step S103. Finally, an estimated remaining service life may be estimated by a pitch bearing remaining service life prediction module as shown in FIG. 3.

In an embodiment, gradually determining the estimated equivalent load, the estimated service life consumption and the estimated remaining service life includes: determining the probability densities of the multiple estimated wind speeds; for each of the pitch driving torques at each of the estimated wind speeds, determining a product of the probability density of the estimated wind speed, an m-th power of the pitch driving torque, a probability density of the pitch driving torque and the estimated angle cumulative value, and calculating a sum of the products corresponding to the pitch driving torques at the estimated wind speeds to obtain an estimated reference load, where m represents a material Wall coefficient of the pitch bearing; and determining a (1/m)-th power of the estimated reference load as the estimated equivalent load.

For a pitch system of a wind turbine in a target future period T, N pitch driving torques are divided, and an estimated equivalent load of a pitch bearing is expressed by the following equation:

$$L_{DEQ_{pred_T}} = \sqrt[m]{\sum_{v=wsp_{cutin}}^{wsp_{cutout}} \sum_{i=1}^{N} \Delta\phi_v p_v(L_i) L_i^m f(v)}$$

f(v) represents a probability density of an estimated wind speed, which follows a Rayleigh distribution and is only related to an annual average wind speed.

An estimated remaining service life of the pitch bearing in the target future period T is expressed by the following equation:

$$l_{remain} = \text{lifetime}_{design} - l_{cost} - l_{pred}$$

$l_{cost}$ represents a consumed service life, which is obtained by step S104, and $l_{pred}$ represents an estimated service life consumption in the target future period T, which satisfies the following equation:

$$l_{pred} = \frac{L^m_{DEQ_{pred_T}}}{L^m_{DEQ_{design}}} \text{lifetime}_{design}$$

According to a service life evaluation method for a pitch bearing of a wind turbine in an embodiment of the present disclosure, the service life of the pitch bearing is evaluated by using operation data collected during operation of the wind turbine and estimated wind resource parameters that may be predicted based on the current technology. No additional data is required to be collected, and thus no additional data collection sensor is required to be deployed. Therefore, a product cost can be reduced and a time cost of service life evaluation can be saved. According to the present disclosure, within an acceptable precision range, real-time online evaluation of a consumed service life and prediction of a future remaining service life can be achieved. Predictive operation and maintenance and prediction of failure events may be carried out on the premise of ensuring safe operation of the wind turbine, thereby reducing unplanned downtime of the wind turbine and improving its economic benefit.

Figure 4:
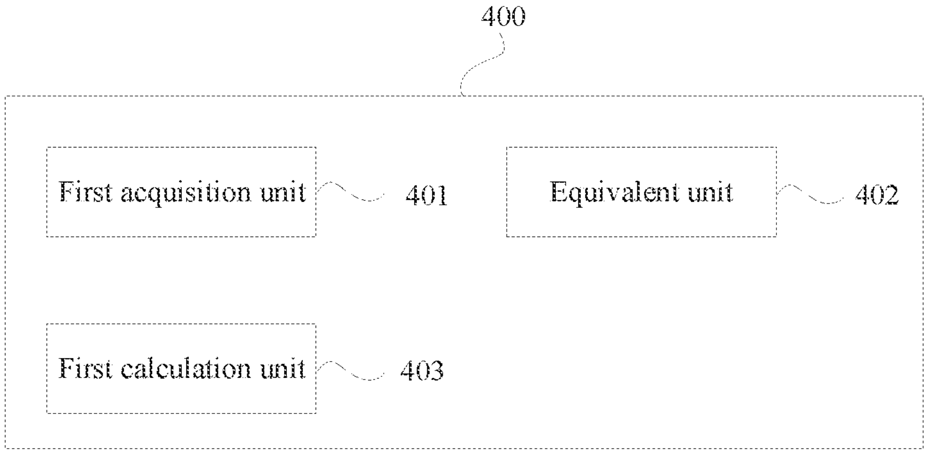
FIG. 4 is a block diagram illustrating a service life evaluation device for a pitch bearing of a wind turbine according to an embodiment of the present disclosure.

FIG. 4 is a block diagram illustrating a service life evaluation device for a pitch bearing of a wind turbine according to an embodiment of the present disclosure.

Referring to FIG. 4, the device 400 for evaluating service life of a pitch bearing of a wind turbine includes a first acquisition unit 401, an equivalent unit 402, and a first calculation unit 403, which corresponds to the pitch bearing online service life evaluation system as shown in FIG. 2.

The first acquisition unit 401 may be configured to acquire a probability density of a pitch driving torque in M historical periods, where M is a positive integer. Because the pitch driving torque may affect a loss of the pitch bearing, this parameter is selected to evaluate a service life of the pitch bearing. Further, the wind turbine may generally operate for several years cumulatively. Cumulative operation duration may be divided into M historical periods based on a certain step, and data processing may be carried out separately for each of the historical periods, to ensure the consistency of duration of a single historical period used in evaluation of different wind turbines, thus ensuring the universality of the strategy.

In an embodiment, the pitch driving torque usually changes in a certain interval. Multiple specific numerical values may be selected from the interval. For example, multiple specific pitch driving torques are obtained based on a set step. That is, the selected multiple pitch driving torques may form an arithmetic progression. Then, a probability density of each of the pitch driving torques in each of the historical periods is acquired.

Referring to FIG. 2, the first acquisition unit 401 may be configured to: for each of the pitch driving torques, determine an occurrence frequency of the pitch driving torque in each of different pitch motion states and a corresponding distribution parameter based on operation data in the M historical periods (it should be understood that "corresponding" here means that the distribution parameter corresponds to the occurrence frequency and also to the pitch motion state), where the pitch motion states include forward state, constant state and backward state; and determine the probability density based on the occurrence frequencies and the corresponding distribution parameters. According to an embodiment of the present disclosure, operation data of the wind turbine is collected by a data collection system as shown in FIG. 2. Thus, before the occurrence frequency and the corresponding distribution parameter are determined, the first acquisition unit 401 may be further configured to collect operation data of the wind turbine in the M historical periods. The operation data is SCADA data, including an output power, an impeller rotation speed, a generator torque, a nacelle acceleration x-direction component, a nacelle acceleration y-direction component and a pitch angle, which may fully reflect operation conditions of the wind turbine, these conditions being related to the pitch driving torque. Therefore, the distribution parameter of the pitch driving torque may be determined by the pitch driving torque distribution evaluation module as shown in FIG. 2 accordingly. In addition, because the data is collected during operation of the wind turbine, no additional data is required to be collected, and thus no additional data collection sensor is required to be configured. Therefore, a product cost can be reduced and a time cost of service life evaluation can be saved, thus improving the economic performance.

Based on the forward state, the backward state and the constant state of blade pitch, there are three different pitch motion states. In each of the historical periods, the pitch driving torque may go through all these three states. Therefore, an occurrence frequency of the pitch driving torque in each of the three pitch motion states and a corresponding distribution parameter may be determined, to describe the pitch driving torque more accurately.

In an embodiment, the first acquisition unit 401 may be configured to: for each of the historical periods, determine a product of a correlation coefficient matrix, a first transfer function and an operation data column vector to obtain a first column vector, where the number of rows of the correlation coefficient matrix is equal to a sum of the number of occurrence frequencies and the number of corresponding distribution parameters, and the operation data column vector includes multiple items of the operation data; determine a sum of the first column vector and a first correlation coefficient column vector, and multiply the sum with a second transfer function to obtain a second column vector; and determine a sum of the second column vector and a second correlation coefficient column vector (which is equivalent to changing the weighted sums described above for many times) as an output vector, where the output vector includes values of the occurrence frequency and the corresponding distribution parameter. Thus, data is converted. According to an embodiment of the present disclosure, the correlation coefficient matrix, the first correlation coefficient column vector, the second correlation coefficient column vector, the first transfer function and the second transfer function are obtained by testing or training.

The first acquisition unit 401 may be further configured to acquire an angle cumulative value of a pitch angle in each of the M historical periods. The angle cumulative value is obtained by the cumulative pitch module as shown in FIG. 2. Pitch variation essentially means that the blades rotate by a certain angle under the action of the pitch driving torque. Therefore, t accumulation of the pitch driving torque in the term of the pitch angle can fully reflect a load borne by the pitch bearing. The acquired angle cumulative value may be used as a basis for service life evaluation of the pitch bearing.

The equivalent unit 402 may be configured to determine an equivalent load of the pitch bearing based on the pitch driving torque, the probability density of the pitch driving torque in the M historical periods, and angle cumulative values in the M historical periods. The equivalent load of the pitch bearing is obtained by the pitch bearing consumed service life evaluation module as shown in FIG. 2. As mentioned above, the equivalent load of the pitch bearing may be obtained by the accumulation of the pitch driving torque in the term of the pitch angle.

In an embodiment, the equivalent unit 402 may be configured to: for each of the historical periods, determine a product of an m-th power of each pitch driving torque, a probability density of the pitch driving torque and the angle cumulative value, and calculate a sum of the products corresponding to the pitch driving torques to obtain a reference load for the historical period, where m represents a material Wall coefficient of the pitch bearing; determine a reference load average value in multiple historical periods; and determine a (1/m)-th power of the reference load average value as the equivalent load of the pitch bearing.

The first calculation unit 403 may be configured to determine a consumed service life of the pitch bearing based on the equivalent load of the pitch bearing. The consumed service life is obtained by the pitch bearing consumed service life evaluation module as shown in FIG. 2. In an embodiment, a ratio of the equivalent load of the pitch bearing to a designed equivalent load may be determined first, and then a product of the ratio and a designed service life of the pitch bearing may be determined as the consumed service life of the pitch bearing.

Figure 5:
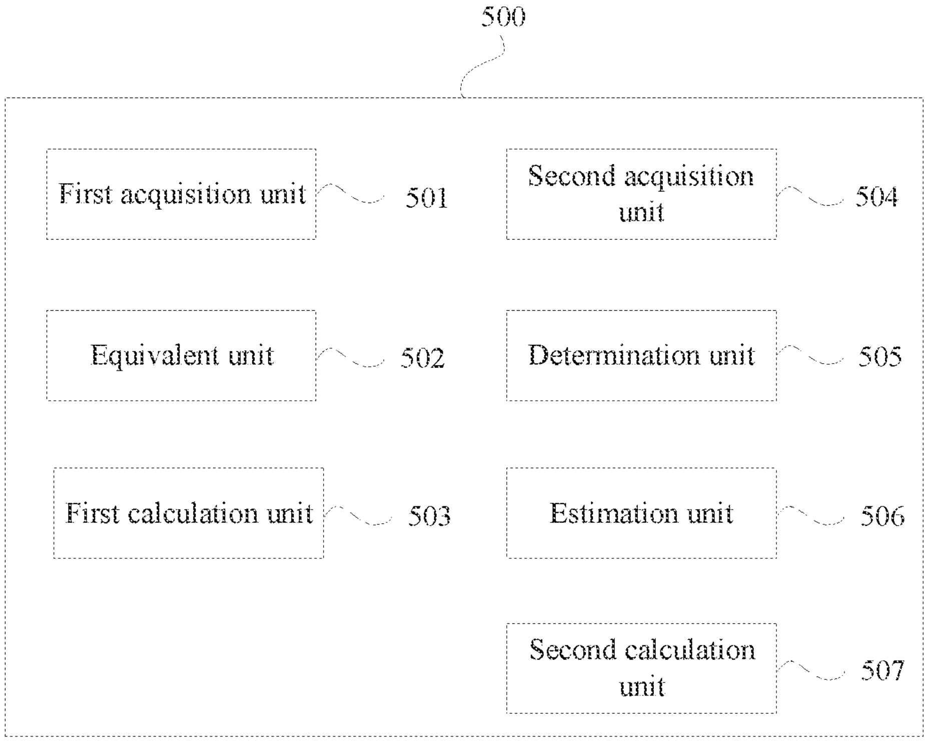
FIG. 5 is a block diagram illustrating a service life evaluation device for a pitch bearing of a wind turbine according to another embodiment of the present disclosure.

FIG. 5 is a block diagram illustrating a service life evaluation device for a pitch bearing of a wind turbine according to another embodiment of the present disclosure.

Referring to FIG. 5, the device 500 for evaluating service life of a pitch bearing of a wind turbine includes a first acquisition unit 501, an equivalent unit 502, a first calculation unit 503, a second acquisition unit 504, a determination unit 505, an estimation unit 506, and a second calculation unit 507. The first acquisition unit 501, the equivalent unit 502, and the first calculation unit 503 correspond to the pitch bearing online service life evaluation system as shown in FIG. 2, and perform the same actions as the first acquisition unit 401, the equivalent unit 402, and the first calculation unit 403, which are not repeated here. The second acquisition unit 504, the determination unit 505, the estimation unit 506, and the second calculation unit 507 correspond to the system for predicting remaining service life of a pitch bearing as shown in FIG. 3.

The second acquisition unit 504 may be configured to acquire estimated wind resource parameters of multiple wind turbine positions in a target future period, where the estimated wind resource parameters include estimated wind speeds. As an example, the estimated wind speed may be an annual average wind speed. The estimated wind resource parameters further include a turbulence intensity, a wind shear and an air density. For a wind power plant, different estimated wind speeds may occur with different attribute values (different turbulence intensities, different wind shears, or the like). An input (i.e., estimated wind resource parameters) of the pitch driving torque distribution estimation module and the cumulative pitch angle prediction module is a single estimated wind speed and its attribute value, and the air density is added to the estimated wind resource parameters as a constant attribute value.

The determination unit 505 may be configured to, for each of the pitch driving torques, determine a probability density of the pitch driving torque at multiple estimated wind speeds and an estimated angle cumulative value of the pitch angle in the target future period based on the estimated wind resource parameters. For its determination method, reference may be made to the first acquisition unit 501, which may be implemented by using the transfer function and correlation coefficient.

The estimation unit 506 may be configured to determine an estimated equivalent load of the pitch bearing in the target future period based on the multiple estimated wind speeds, the pitch driving torques, the probability density of each pitch driving torque at the multiple estimated wind speeds, and the estimated angle cumulative value at the multiple estimated wind speeds.

In an embodiment, the estimation unit 506 may be configured to: determine the probability densities of the multiple estimated wind speeds; for each of the pitch driving torques at each of the estimated wind speeds, determine a product of the probability density of the estimated wind speed, an m-th power of the pitch driving torque, a probability density of the pitch driving torque and the estimated angle cumulative value, and calculate a sum of the products corresponding to the pitch driving torques at the estimated wind speeds to obtain an estimated reference load, where m represents a material Wall coefficient of the pitch bearing; and determine a (1/m)-th power of the estimated reference load as the estimated equivalent load.

The second calculation unit 507 may be configured to determine an estimated service life consumption of the pitch bearing in the target future period based on the estimated equivalent load. For its determination method, reference may be made to the first calculation unit 503.

The second calculation unit 507 may be further configured to determine an estimated remaining service life of the pitch bearing based on a designed service life, the consumed service life and the estimated service life consumption of the pitch bearing. Here, the consumed service life is obtained by the first calculation unit 503. In an embodiment, the estimated remaining service life may be determined by subtracting the consumed service life and the estimated service life consumption from the designed service life.

For a pitch bearing of a wind turbine in operation, a consumed service life may be obtained by online system for evaluating service life of a pitch bearing as shown in FIG. 2. For a remaining service life, although operation data of the wind turbine in future cannot be acquired in advance, subsequent operation of the wind turbine is affected by wind resource conditions of a wind power plant in future. Based on estimated wind resource parameters of multiple wind turbine positions in a target future period, an estimated equivalent load of the pitch bearing in the target future period may be estimated, thus a service life consumption in the target future period may be evaluated. Finally, an estimated remaining service life of the pitch bearing at the end of the target future period may be obtained by collectively considering the estimated service life consumption with a designed service life and the consumed service life. Because wind resource parameters for the next few years may be predicted based on the current wind resource analysis technology, estimated wind resource parameters in the target future period may be obtained by a data collection system and a wind resource statistical analysis module as shown in FIG. 3. Therefore, no additional data is required to be collected, and thus no additional data collection sensor is required to be deployed. Therefore, a product cost can be reduced and a time cost of service life evaluation can be saved, thus improving the economic performance.

A service life evaluation method for a pitch bearing of a wind turbine according to an embodiment of the present disclosure may be written as a computer program and stored on a computer-readable storage medium. Instructions corresponding to the computer program, when executed by a processor, implement the service life evaluation method for the pitch bearing of the wind turbine as described above. Examples of the computer-readable storage medium include: read-only memory (ROM), random-access programmable read-only memory (PROM), electrically erasable programmable read-only memory (EEPROM), random-access memory (RAM), dynamic random-access memory (DRAM), static random-access memory (SRAM), flash memory, nonvolatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disk memory, hard disk drive (HDD), solid state hard disk (SSD), card-type memory (such as a multimedia card, a secure digital (SD) card or an extreme digital (XD) card), a magnetic tape, a floppy disk, a magneto-optical data storage device, an optical data storage device, a hard disk, a solid state disk, and any other device configured to store a computer program and any associated data, data files and data structures in a non-transitory manner and provide the computer program and any associated data, data files and data structures to a processor or computer to enable the processor or computer to execute the computer program. In an example, the computer program and any associated data, data files and data structures are distributed on a networked computer system, so that the computer program and any associated data, data files and data structures are stored, accessed and executed in a distributed manner by one or more processors or computers.

Figure 6:
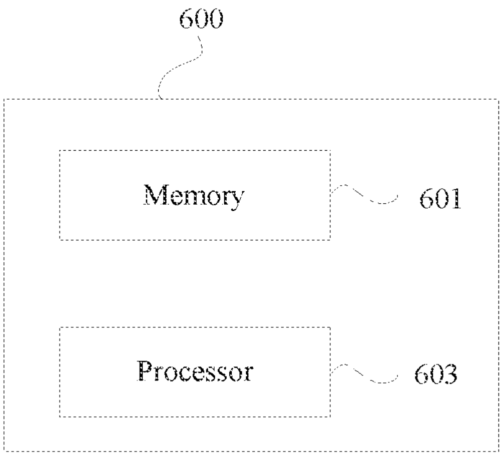
FIG. 6 is a block diagram illustrating a computer apparatus according to an embodiment of the present disclosure.

FIG. 6 is a block diagram illustrating a computer apparatus according to an embodiment of the present disclosure.

Referring to FIG. 6, a computer apparatus 600 includes at least one memory 601 and at least one processor 602. The at least one memory 601 is configured to store a set of computer-executable instructions. The set of computer-executable instructions, when executed by the at least one processor 602, performs the service life evaluation method for the pitch bearing of the wind turbine according to the exemplary embodiment of the present disclosure.

As an example, the computer apparatus 600 may be a PC computer, a tablet device, a personal digital assistant, a smart phone, or other devices capable of executing the set of instructions described above. Here, the computer apparatus 600 is not necessarily a single electronic apparatus, but may also be any set of devices or circuits capable of individually or jointly executing the above instructions (or the set of instructions). The computer apparatus 600 may also be a part of an integrated control system or a system manager, or may be configured as a portable electronic apparatus that interfaces locally or remotely (such as via wireless transmission).

In the computer apparatus 600, the processor 602 may include a central processing unit (CPU), a graphics processing unit (GPU), a programmable logic device, a special purpose processor system, a microcontroller or a microprocessor. By way of example rather than limitation, the processor may also include an analog processor, a digital processor, a microprocessor, a multi-core processor, a processor array, a network processor, or the like.

Instructions or codes stored in the memory 601 may be executed by the processor 602. The memory 601 may also store data. Instructions and data may also be sent and received over a network via a network interface device, where the network interface device may adopt any known transmission protocol.

The memory 601 may be integrated with the processor 602. For example, an RAM or flash memory is provided within an integrated circuit microprocessor or the like. In addition, the memory 601 may include separate devices, such as external disk drives, storage arrays, or any other storage devices that may be used by a database system. The memory 601 and the processor 602 may be operatively coupled, or may communicate with each other, for example, through an I/O port, a network connection, or the like, to enable the processor 602 to read files stored in the memory.

In addition, the computer apparatus 600 may further include a video display (such as a liquid crystal display) and a user interaction interface (such as a keyboard, a mouse, a touch input device, or the like). All components of the computer apparatus 600 may be connected to each other via a bus and/or a network.

According to the present disclosure, a service life of a pitch bearing is evaluated by using operation data inevitably to be collected during operation of a wind turbine and estimated wind resource parameters that can be predicted based on the current technology. No additional data is required to be collected, and thus no additional data collection sensor is required to be deployed. Therefore, a product cost can be reduced and a time cost of service life evaluation can be saved. According to the present disclosure, within an acceptable precision range, real-time online evaluation of a consumed service life and prediction of a future remaining service life can be achieved. Predictive operation and maintenance and prediction of failure events may be carried out on the premise of ensuring safe operation of the wind turbine, thereby reducing unplanned downtime of the wind turbine and improving its economic benefit.

The specific embodiments of the present disclosure have been described in detail above. Although some embodiments have been shown and described, it should be understood by those skilled in the art that, modifications and variations may be made to these embodiments without departing from the principle and spirit of the present disclosure whose scope is defined by the claims and their equivalents, and these modifications and variations should also be deemed to fall in the protection scope of the claims of the present disclosure.

The invention claimed is:

1. A service life evaluation method for a pitch bearing of a wind turbine, comprising:

acquiring a probability density of a pitch driving torque in M historical periods, wherein M is a positive integer;

acquiring an angle cumulative value of a pitch angle in each of the M historical periods;

determining an equivalent load of the pitch bearing based on the pitch driving torque, the probability density of the pitch driving torque in the M historical periods, and angle cumulative values in the M historical periods; and determining a consumed service life of the pitch bearing based on the equivalent load of the pitch bearing.

2. The method according to claim 1, wherein the acquiring the probability density of the pitch driving torque in M historical periods comprises:

determining an occurrence frequency of the pitch driving torque in each of different pitch motion states and a corresponding distribution parameter based on operation data in the M historical periods, wherein the pitch motion states comprises forward state, constant state and backward state; and determining the probability density based on the occurrence frequencies and the corresponding distribution parameters.

3. The method according to claim 2, wherein the determining the occurrence frequency of the pitch driving torque in each of different pitch motion states and the corresponding distribution parameter based on operation data in the M historical periods comprises:

for each of the historical periods, determining a first column vector based on a product of a correlation coefficient matrix, a first transfer function and an operation data column vector, wherein the number of rows of the correlation coefficient matrix is equal to a sum of the number of occurrence frequencies and the number of corresponding distribution parameters, and the operation data column vector comprises a plurality of items of operation data;

determining a sum of the first column vector and a first correlation coefficient column vector, and multiplying the sum of the first column vector and the first correlation coefficient column vector with a second transfer function to obtain a second column vector; and determining a sum of the second column vector and a second correlation coefficient column vector as an output vector, wherein the output vector comprises the occurrence frequency and the corresponding distribution parameter, wherein the correlation coefficient matrix, the first correlation coefficient column vector, the second correlation coefficient column vector, the first transfer function and the second transfer function are obtained by testing or training.

4. The method according to claim 2, wherein before determining the occurrence frequency of the pitch driving torque in each of different pitch motion states and the corresponding distribution parameter based on the operation data in the M historical periods, the method further comprises:

collecting operation data of the wind turbine in the M historical periods; wherein the operation data comprises an output power, an impeller rotation speed, a generator torque, a nacelle acceleration x-direction component, a nacelle acceleration y-direction component and the pitch angle.

5. The method according to claim 1, wherein a plurality of pitch driving torques are obtained, wherein the determining the equivalent load of the pitch bearing based on the pitch driving torque, the probability density of the pitch driving torque in the M historical periods, and angle cumulative values in the M historical periods comprises:

for each of the M historical periods, determining a product of an m-th power of each pitch driving torque, the probability density of the pitch driving torque and the angle cumulative value, and calculating a sum of the products corresponding to the plurality of pitch driving torques to obtain a reference load for the historical period, wherein m represents a material Wall coefficient of the pitch bearing;

determining a reference load average value in the M historical periods; and determining a (1/m)-th power of the reference load average value as the equivalent load of the pitch bearing.

6. The method according to claim 5, wherein the plurality of pitch driving torques are obtained by:

within a pitch driving torque change interval, obtaining the plurality of pitch driving torques based on a set step.

7. The method according to claim 1, further comprising:

acquiring estimated wind resource parameters of a plurality of wind turbine positions in a target future period, wherein the estimated wind resource parameters comprise estimated wind speeds;

determining probability densities of the pitch driving torque at the estimated wind speeds and an estimated angle cumulative value of the pitch angle in the target future period based on the estimated wind resource parameters;

determining an estimated equivalent load of the pitch bearing in the target future period based on the estimated wind speeds, the pitch driving torque, the probability densities of the pitch driving torque at the estimated wind speeds, and the estimated angle cumulative value at the estimated wind speeds;

determining an estimated service life consumption of the pitch bearing in the target future period based on the estimated equivalent load; and determining an estimated remaining service life of the pitch bearing based on a designed service life, the consumed service life and the estimated service life consumption of the pitch bearing.

8. The method according to claim 7, wherein the estimated wind resource parameters further comprise a turbulence intensity, a wind shear and an air density.

9. The method according to claim 7, wherein the determining the estimated equivalent load of the pitch bearing in the target future period based on the estimated wind speeds, the pitch driving torque, the probability densities of the pitch driving torque at the estimated wind speeds, and the estimated angle cumulative value at the estimated wind speeds comprises:

determining the probability densities of the estimated wind speeds;

for each of the pitch driving torques at each of the estimated wind speeds, determining a product of the probability density of the estimated wind speed, an m-th power of the pitch driving torque, the probability density of the pitch driving torque and the estimated angle cumulative value, and calculating a sum of the products corresponding to the pitch driving torques at the estimated wind speeds to obtain an estimated reference load, wherein m represents a material Wall coefficient of the pitch bearing; and determining a (1/m)-th power of the estimated reference load as the estimated equivalent load.

10. A service life evaluation device for a pitch bearing of a wind turbine, comprising:

at least one processor; and at least one memory configured to store computer-executable instructions, wherein the computer-executable instructions, when executed by the at least one processor, cause the at least one processor to:

acquire a probability density of a pitch driving torque in M historical periods, and acquire an angle cumulative value of a pitch angle in each of the M historical periods, wherein M is a positive integer;

determine an equivalent load of the pitch bearing based on the pitch driving torque, the probability density of the pitch driving torque in the M historical periods, and angle cumulative values in the M historical periods; and determine a consumed service life of the pitch bearing based on the equivalent load of the pitch bearing.

11. The device according to claim 10, wherein the at least one processor is further configured to:

determine an occurrence frequency of the pitch driving torque in each of different pitch motion states and a corresponding distribution parameter based on operation data in the M historical periods, wherein the pitch motion states comprise forward state, constant state and backward state; and determine the probability density based on the occurrence frequencies and the corresponding distribution parameters.

12. The device according to claim 11, wherein the at least one processor is further configured to:

for each of the historical periods, determine a first column vector based on a product of a correlation coefficient matrix, a first transfer function and an operation data column vector, wherein the number of rows of the correlation coefficient matrix is equal to a sum of the number of occurrence frequencies and the number of corresponding distribution parameters, and the operation data column vector comprises a plurality of items of operation data;

determine a sum of the first column vector and a first correlation coefficient column vector, and multiply the sum of the first column vector and the first correlation coefficient column vector with a second transfer function to obtain a second column vector; and determine a sum of the second column vector and a second correlation coefficient column vector as an output vector, wherein the output vector comprises the occurrence frequency and the corresponding distribution parameter, wherein the correlation coefficient matrix, the first correlation coefficient column vector, the second correlation coefficient column vector, the first transfer function and the second transfer function are obtained by testing or training.

13. The device according to claim 11, wherein the at least one processor is further configured to:

collect operation data of the wind turbine in the M historical periods; wherein the operation data comprises an output power, an impeller rotation speed, a generator torque, a nacelle acceleration x-direction component, a nacelle acceleration y-direction component and a pitch angle.

14. The device according to claim 10, wherein a plurality of pitch driving torques are obtained, and the at least one processor is further configured to:

for each of the M historical periods, determine a product of an m-th power of each pitch driving torque, the probability density of the pitch driving torque and the angle cumulative value, and calculate a sum of the products corresponding to the plurality of pitch driving torques to obtain a reference load for the historical period, wherein m represents a material Wall coefficient of the pitch bearing;

determine a reference load average value in the M historical periods; and determine a (1/m)-th power of the reference load average value as the equivalent load of the pitch bearing.

15. The device according to claim 14, wherein the plurality of pitch driving torques are obtained by:

within a pitch driving torque change interval, obtaining the plurality of pitch driving torques based on a set step.

16. The device according to claim 10, wherein the at least one processor is further configured to:

acquire estimated wind resource parameters of a plurality of wind turbine positions in a target future period, wherein the estimated wind resource parameters comprise estimated wind speeds;

determine probability densities of the pitch driving torque at the estimated wind speeds and an estimated angle cumulative value of the pitch angle in the target future period based on the estimated wind resource parameters;

determine an estimated equivalent load of the pitch bearing in the target future period based on the estimated wind speeds, the pitch driving torque, the probability densities of the pitch driving torque at the estimated wind speeds, and the estimated angle cumulative value at the estimated wind speeds; and determine an estimated service life consumption of the pitch bearing in the target future period based on the estimated equivalent load, and determine an estimated remaining service life of the pitch bearing based on a designed service life, the consumed service life and the estimated service life consumption of the pitch bearing.

17. The device according to claim 16, wherein the estimated wind resource parameters further comprise a turbulence intensity, a wind shear and an air density.

18. The device according to claim 16, wherein the at least one processor is further configured to:

determine the probability densities of the estimated wind speeds;

for each of the pitch driving torques at each of the estimated wind speeds, determine a product of the probability density of the estimated wind speed, an m-th power of the pitch driving torque, the probability density of the pitch driving torque and the estimated angle cumulative value, and calculate a sum of the products corresponding to the pitch driving torques at the estimated wind speeds to obtain an estimated reference load, wherein m represents a material Wall coefficient of the pitch bearing; and determine a (1/m)-th power of the estimated reference load as the estimated equivalent load.

19. A non-transitory computer-readable storage medium, wherein instructions in the computer-readable storage medium, when executed by at least one processor, cause the at least one processor to perform:

acquiring a probability density of a pitch driving torque in M historical periods, wherein M is a positive integer;

acquiring an angle cumulative value of a pitch angle in each of the M historical periods;

determining an equivalent load of the pitch bearing based on the pitch driving torque, the probability density of the pitch driving torque in the M historical periods, and angle cumulative values in the M historical periods; and determining a consumed service life of the pitch bearing based on the equivalent load of the pitch bearing.

* * * * *